(12) United States Patent
Ganthaler et al.

(10) Patent No.: US 10,023,048 B2
(45) Date of Patent: Jul. 17, 2018

(54) CONTAINER FOR AUTOMOTIVE SERVICE LIQUIDS WITH LOCAL THERMAL INSULATION INTEGRATED IN THE TANK WALL

(71) Applicant: Röchling Automotive SE & Co. KG, Mannheim (DE)

(72) Inventors: Christoph Ganthaler, Naturns (IT); Ferdinand Di Pauli, Bolzano (IT)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 0 days.

(21) Appl. No.: 15/465,692

(22) Filed: Mar. 22, 2017

(65) Prior Publication Data

US 2017/0334289 A1    Nov. 23, 2017

(30) Foreign Application Priority Data

May 20, 2016  (DE) .................. 10 2016 208 810
Mar.  1, 2017  (DE) .................. 10 2017 203 298

(51) Int. Cl.
| | |
|---|---|
| *F01N 3/00* | (2006.01) |
| *B60K 15/077* | (2006.01) |
| *F01N 3/28* | (2006.01) |
| *F01N 3/20* | (2006.01) |
| *B01D 53/94* | (2006.01) |
| *B60K 15/03* | (2006.01) |

(52) U.S. Cl.
CPC ........ *B60K 15/077* (2013.01); *B01D 53/9431* (2013.01); *F01N 3/2066* (2013.01); *F01N 3/2896* (2013.01); *B60K 2015/03328* (2013.01); *F01N 2570/14* (2013.01)

(58) Field of Classification Search
USPC ................ 60/286, 295, 297, 301, 303
See application file for complete search history.

(56) References Cited

U.S. PATENT DOCUMENTS

| | | | |
|---|---|---|---|
| 5,809,775 A * | 9/1998 | Tarabulski | B01D 53/90 |
| | | | 423/212 |
| 8,429,900 B2 * | 4/2013 | Knetsch | B01D 53/90 |
| | | | 60/286 |

(Continued)

FOREIGN PATENT DOCUMENTS

DE    102008054645 A1    6/2010

OTHER PUBLICATIONS

Espacenet Bibliographic data:DE102008054645 (A1), Published Jun. 17, 2010, 2pgs.

*Primary Examiner* — Binh Q Tran
(74) *Attorney, Agent, or Firm* — Rankin, Hill & Clark LLP

(57) ABSTRACT

An automotive service liquid tank for receiving a service liquid of a motor vehicle, in particular an aqueous urea solution, has a tank wall that encloses a tank volume on the inside of the tank, wherein the tank has locally, by comparison with at least one other tank region, at least one region with enhanced thermal insulation, in order to influence a freezing behavior of the service liquid received in the tank in such a way that the service liquid, when the outside temperature drops, freezes later in the tank region with enhanced thermal insulation than in the at least one other tank region without enhanced thermal insulation. According to the invention it is provided that the enhanced thermal insulation is formed integrally with the tank wall.

10 Claims, 3 Drawing Sheets

(56) References Cited

U.S. PATENT DOCUMENTS

| | | | | |
|---|---|---|---|---|
| 9,074,510 B2* | 7/2015 | Bauer | ................... | F01N 3/2066 |
| 2007/0079599 A1* | 4/2007 | Osaku | ................... | F01N 3/2066 60/283 |
| 2009/0277156 A1* | 11/2009 | Hodgson | ............... | F01N 3/2066 60/274 |
| 2015/0361854 A1* | 12/2015 | Outman | ................ | F01N 3/2066 60/303 |

* cited by examiner

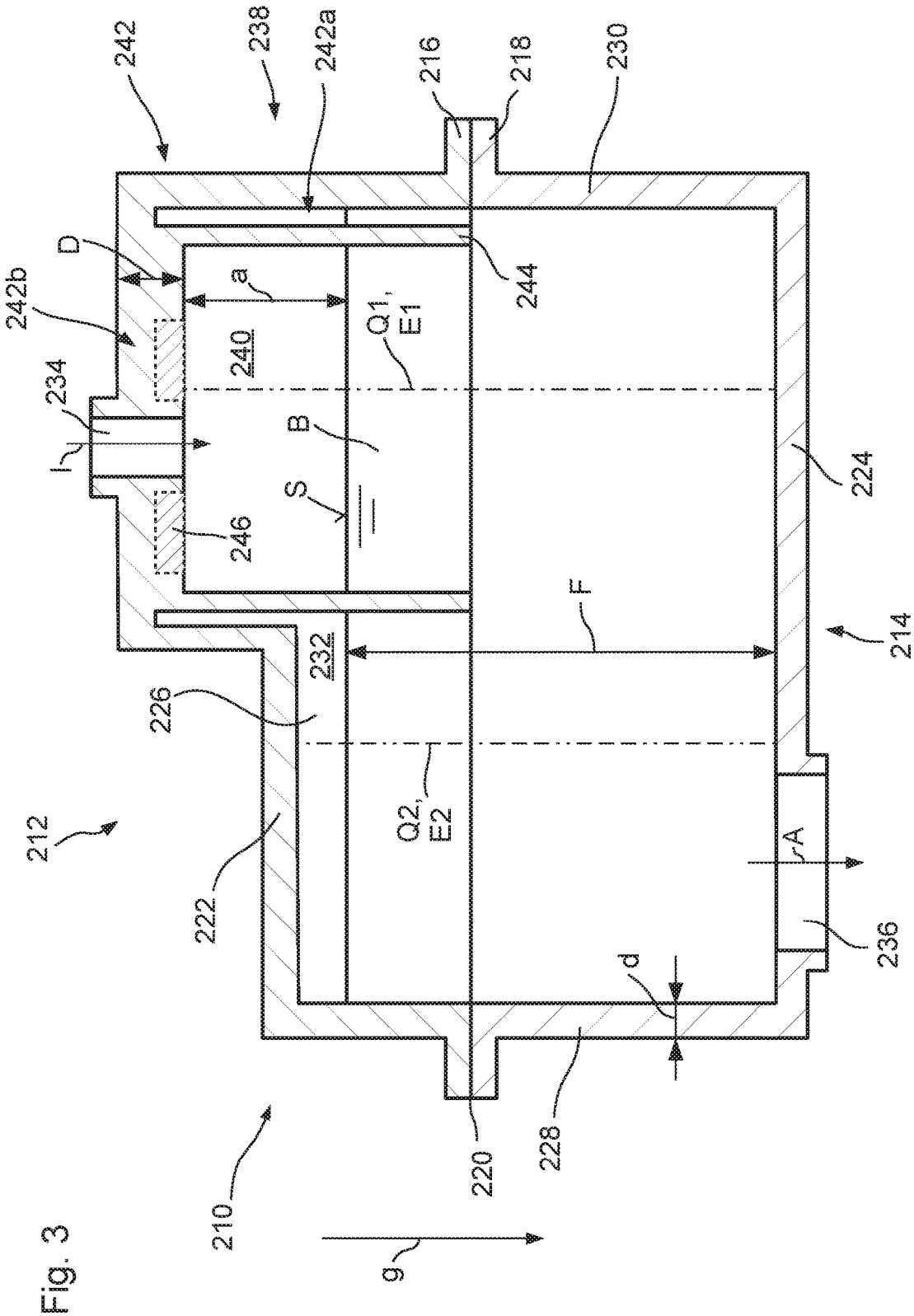

CONTAINER FOR AUTOMOTIVE SERVICE LIQUIDS WITH LOCAL THERMAL INSULATION INTEGRATED IN THE TANK WALL

The present invention relates to an automotive service liquid tank for receiving a service liquid of a motor vehicle, in particular an aqueous urea solution, comprising a tank wall that encloses a tank volume on the inside of the tank, which tank has locally, compared to at least one other tank region, at least one region with enhanced thermal insulation, in order to influence a freezing behavior of the service liquid received in the tank in such a way that the service liquid, in case of a drop in outside temperature, in the tank region with enhanced thermal insulation will freeze later than in the at least one other tank region without enhanced thermal insulation.

BACKGROUND OF THE INVENTION

Patent No. DE 10 2008 054 645 A1 discloses a tank for a service liquid in a motor vehicle wherein the tank is used for providing an aqueous urea solution in a motor vehicle.

One problem with respect to providing an aqueous urea solution that is used as a reducing agent for reducing nitric oxides in the exhaust gas stream of internal combustion engines is its comparatively high freezing point. It freezes as early as at temperatures of −11° C. and below, which are easily reached during winter periods in central Europe.

When aqueous urea solution freezes, it expands to a substantial extent, which can cause a substantial mechanical load on the tank storing the urea solution. In the course of this, when freezing, the aqueous urea solution may expand to such extent that the tank bursts. This problem is aggravated even further if during the freezing of the aqueous urea solution in the tank, a liquid bubble completely enclosed by already frozen solution forms, which freezes last. As a result of the freezing of a liquid bubble that is enclosed by an already frozen solution, enormous forces may occur on the freezing solution and thus on the tank wall regions wetted thereby.

The known generic document therefore teaches insulation elements that are locally disposed on the outside of the tank, in order to prevent locally any thermal passage from the inside of the tank to the outer environment of the tank and to ensure in this way a directed ice formation in the tank.

The generic document further teaches to provide the insulation elements above all in places where sensitive units are provided in the tank, for example sensors or conveying devices and the like, in order to prevent the destruction thereof during freezing of the solution.

What is of disadvantage in the known generic solution is the associated high manufacturing and assembly complexity, since first of all, insulation elements have to be produced for a service liquid tank, which must allow a gap-free mounting to the tank so as to allow their thermal insulating effect to develop to its full potential. Moreover, these insulation elements, which have to be manufactured with a high degree of accuracy, have to be separately mounted after the assembly of the tank.

SUMMARY OF THE INVENTION

It is therefore an object of the present invention to improve the generic service liquid tank in such a way that it can be produced and operated with little expense.

According to the invention, this object, and others, is achieved by means of an automotive service liquid tank of the type mentioned in the beginning, wherein the enhanced thermal insulation is integrated into the tank wall.

As a result of the integral formation of the thermal insulation with the tank wall, the separate manufacturing of one or more insulation elements as necessary in the prior art is avoided, and further, the need is avoided to produce the tank and matching insulation elements with such small tolerances that they can be assembled together without any gaps. Thus, according to the invention, the tank wall is provided with locally enhanced thermal insulation where it is needed, whilst other regions of the tank or of the tank wall may go without any enhanced thermal insulation. As a result, any unnecessary weight and any unnecessary occupation of space are avoided.

Whilst any tank wall of a service liquid tank has a thermal insulation effect because a tank wall has a certain heat transfer coefficient, which is a measurement of the amount of heat that passes, at any location due to the material used and the dimensions used at a given temperature differential between the inner tank region and the outer tank environment through the respective tank wall section, the present invention, however, is directed to the locally enhanced thermal insulation of at least one region of a service liquid tank which, compared to at least one other region of the tank wall of the same tank, has an enhanced thermal insulation effect.

According to one development of the present invention, the locally enhanced thermal insulation integrated in the tank wall may be realized by means of an enhanced tank wall thickness. Even in the case of a consistent use of material for the tank wall, for example a thermoplastic resin, a tank wall section having a greater thickness provides an enhanced thermal insulation effect compared to a tank wall section with a lower thickness. Therefore, the tank wall may have regions with a locally different tank wall thickness, where the tank wall is thicker in at least one region that has locally enhanced thermal insulation than in another tank region without enhanced thermal insulation.

Here, the stiffening rib formed on the inside or the outside of the tank wall should therefore, due to a substantially lower width dimension compared to its length dimension, have no sections with a modification to the tank wall thickness in terms of the present invention. Preferably, the at least one thicker tank wall region with enhanced thermal insulation occupies at least 5% of the overall surface of the tank wall, whilst filling and removal openings of the tank are not to be taken into account in the calculation of the tank wall surface. Also, any flanges which in the case of a multi-piece design of the tank might be used to connect tank shells with each other should not be regarded as regions with a thicker tank wall.

In addition or as an alternative, in order to achieve the locally enhanced thermal insulation integral therewith, the tank wall may have locally different thermal conductivities, and the tank wall has, in at least one region which has locally enhanced thermal insulation, a lower thermal conductivity than in another tank region without enhanced thermal insulation. It should be pointed out here that the thermal conductivity is a variable that is a function of the material, which is irrespective of the particular dimension of a component produced from the material.

Therefore, according to a further concept, different thermal conductivity values in different regions of the tank wall may be achieved by using different materials, in terms of process engineering for example by using a multi-component injection molding method. According to a second further concept, additionally or alternatively, different thermal conductivity values in different regions of the tank wall may also be achieved by using one and the same wall material with different characteristics. For example, in the region with reduced thermal conductivity, the wall material may be filled with particles from a material with a thermal conductivity that is lower than that of the matrix material. In principle, also the material in the at least one region without enhanced thermal insulation may be filled with particles, however, in those regions, a different particle material may be used for the filling and/or the degree of filling may, in the at least one region with enhanced thermal insulation, differ from the at least one remaining region without enhanced thermal insulation, which is as a rule higher.

Also, the material in the at least one region with enhanced thermal insulation may have a different, as a rule higher degree of foaming than in the at least one remaining region without enhanced thermal insulation. Here, the material may be present in the region without enhanced thermal insulation in a solid form, i.e. unfoamed, whilst the material in the region with enhanced thermal insulation may be present in a foamed form. This, too, is technically readily feasible using an injection molding method.

Where different materials are used for realizing the tank wall, these will preferably be compatible in order to facilitate a material-locking connection of tank wall regions from different materials with each other. However, such a material selection is not absolutely necessary. Incompatible materials may also be used for forming different tank wall regions. These may then be connected to each other by using a suitable adhesion promoter (adhesive).

A further possibility of forming the locally enhanced thermal insulation integral with the tank wall, which exists in addition or as an alternative to the ones mentioned above, is to form the tank wall with multi-walled structures of locally different degrees, wherein the tank wall has a larger number of sub-walls spaced apart from each other in the direction of the thickness of the tank wall in at least one region with locally enhanced thermal insulation than in another tank region without enhanced thermal insulation. This means that a thermal insulation effect may also be achieved by using a multi-walled structure. In a preferred case, the other tank region without enhanced thermal insulation is no longer formed with multiple walls, but with just one wall, so that the only multi-walled formation of a tank wall region is preferably realized in the at least one region with locally enhanced thermal insulation.

However, it is not to be ruled out that the tank could in principle be designed for example with two walls, in order to provide enhanced burst protection, and in this case the at least one region of the tank wall may be formed with locally enhanced thermal insulation with a triple or quadruple wall.

As has already been indicated above, for realizing at least one region with enhanced thermal insulation, the tank wall may have different materials in different regions. However, it is not necessary here for a material that is different from that of the remaining tank wall in the region with locally enhanced thermal insulation to be the only material in this region. It may also be contemplated that in the region with locally enhanced thermal insulation, two or more different materials are used for forming the tank wall, whilst in a region without locally enhanced thermal insulation, the material wall is formed from just one material or at least from fewer different materials than in the region mentioned above. For example, when producing a tank or a tank shell, it is possible to insert, in an injection molding process, in the region of the desired locally enhanced thermal insulation, an insulation component in a desired place in the mold, which insulation component is joined to the tank wall material processed in an injection molding method by insert molding or overmolding during the subsequent injection molding operation. In this case, not only an increased number of materials, but also different tank wall thicknesses may be realized in the at least one region with locally enhanced thermal insulation.

As has already been described in the beginning, the locally enhanced thermal insulation provides for a reduced heat delivery per time unit in the region of its formation, compared to other tank regions of the tank without enhanced thermal insulation. It can therefore be assumed that in the case of a vehicle parked in a cold environment, the service liquid stored in the tank will freeze in the at least one region with enhanced thermal insulation later, in particular last, compared to other regions.

Since the freezing of an in particular aqueous urea solution is accompanied by a substantial increase in volume of the solution, it is advantageous to provide an expansion space in the at least one region with locally enhanced thermal insulation, in which the volume expansion of the service liquid can take place during freezing without the freezing service liquid at the same time exerting pressure on the tank wall. Therefore, it is preferred according to an advantageous development of the present invention if the enhanced thermal insulation, when viewing the tank in a fully assembled condition in the motor vehicle, is provided in a tank section in which a cross-sectional area of the enclosed inner tank space is greater in a cross-sectional plane orthogonal to a free liquid surface of a service liquid present in the tank than in a cross-sectional plane that is parallel thereto, which penetrates the tank in a region without enhanced thermal insulation. In addition or as an alternative it may be sufficient if, at least when the tank is filled up to the nominal filling level, the distance of the tank top from the service liquid level is greater in the region with locally enhanced thermal insulation than in a region without enhanced thermal insulation.

The last-mentioned cross-sectional plane is parallel to, i.e. disposed at a distance from the first-mentioned cross-sectional area, and it should be sufficient if at least two parallel cross-sectional planes are present, of which one penetrates the tank in the region with locally enhanced thermal insulation and the other penetrates the tank in the region without enhanced thermal insulation. Preferably, the cross-sectional area in the first-mentioned cross-sectional plane is greater than that in the last-mentioned cross-sectional plane by 20%, particularly preferably by 30%.

In order to realize the expansion space for freezing service liquid in the tank, the tank wall may have a protrusion that causes a local increase in the tank volume, and the enhanced thermal insulation may be provided in the region of the protrusion. By providing a local protrusion, the tank volume that is provided as a volume reserve only in the case of the protrusion and does not have a storage function, should be kept as small as possible, so that in other regions of the tank, the distance of the liquid surface from service liquid stored in the tank, when viewing the tank in a fully assembled condition in the motor vehicle, has a substantially smaller distance from the tank top than in the area of the protrusion. The tank volume may thus be efficiently used for storing liquid whilst being well protected from mechanical destruction by freezing service liquid. Since it has proven to be advantageous if the free service liquid surface present in the tank freezes as late as possible, so that the formation of a liquid bubble enclosed by frozen liquid is prevented as much as possible, it is further advantageous if the enhanced thermal insulation, when viewing the tank in a fully assembled condition in the motor vehicle, is provided in the top half of the tank. It is exactly then that the above-described distance of the tank top from the liquid level may advantageously be locally increased in order to provide an expansion volume reserve in the tank.

Where a liquid surface of the service liquid filled into the tank is mentioned in the above description, this is only meant to describe a virtual filling condition. It is therefore not actually necessary for the tank to be filled with service liquid. Indeed, a person skilled in the art will well be able to see the orientation of a service liquid tank in a fully assembled condition in the motor vehicle. However, this orientation also determines the orientation of a liquid level if liquid was to be filled into a tank orientated in this way.

The present invention further relates to a motor vehicle having an automotive service liquid tank, in particular with an arrangement for a selective catalytic reduction of nitric oxides in the exhaust gas, the component of which is the automotive service liquid tank.

According to the present application, the automotive service liquid tank is preferably produced using an injection molding method, and therefore comprises at least two tank shells, for example a top tank shell, which in the fully assembled condition is geodetically at the top, and a bottom tank shell which is geodetically at the bottom, which may be welded or glued together.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 shows a schematic longitudinal sectional view through a third embodiment of an automotive service liquid tank according to the invention.

DESCRIPTION OF PREFERRED EMBODIMENTS

Figure 1:
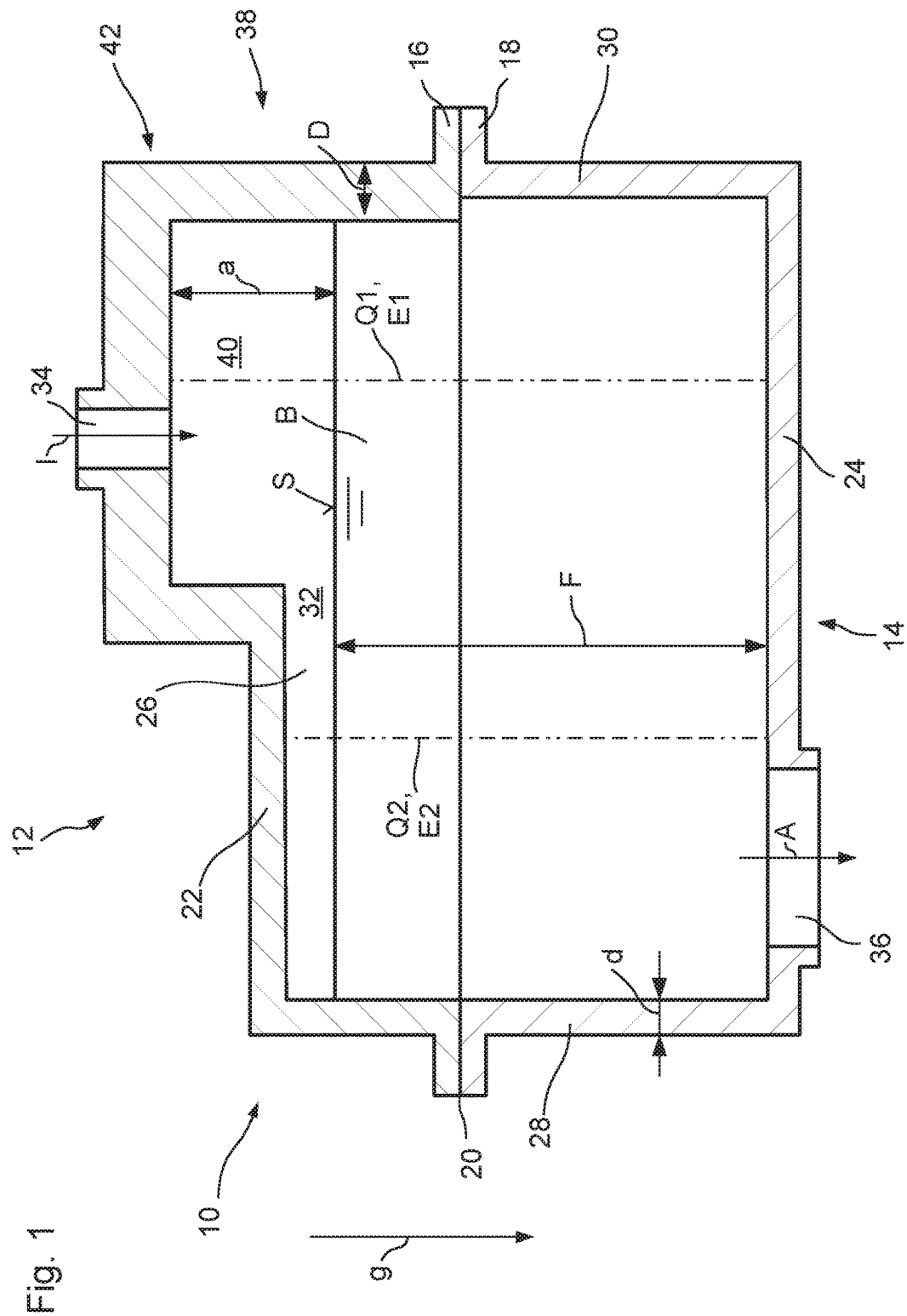
FIG. 1 shows a schematic longitudinal sectional view through a first embodiment of an automotive service liquid tank according to the invention.

Referring now to the drawings wherein the showings are for the purpose of illustrating preferred and alternative embodiments of the invention only and not for the purpose of limiting the same, FIG. 1 shows an embodiment according to certain aspects of the invention of an automotive service liquid tank that is generally identified with 10. In the example shown, the service liquid tank 10 comprises a top tank shell 12 and a bottom tank shell 14, which are joined together in a manner per se known to form the tank 10 by means of radially outwardly extending flanges 16 and 18 whilst forming a joining surface 20. The flanges 16 and 18 are preferably integrally formed with the top tank shell 12 or the bottom tank shell 14.

The tank 10 is schematically shown in FIG. 1 in a longitudinal sectional view, namely in a reference condition that corresponds to a condition in which the tank 10 is fully assembled on a vehicle standing on a horizontal ground. The direction of the gravity effect, which in FIG. 1 is parallel to the drawing figure, is identified with g in FIG. 1.

The tank 10 comprises a tank top 22 that is located opposite a tank bottom 24 in the direction of the gravity effect g. The tank top 22 and the tank bottom 24 are connected to each other via lateral tank walls 26, 28 and 30. A further lateral tank wall is located in front of the figure plane of FIG. 1 and is therefore not shown.

The tank 10 delimits a reception space 32 which, in the reference condition shown in FIG. 1, is delimited towards the top by the tank top 22, towards the bottom by the tank bottom 24 and towards the sides by the lateral tank walls 26, 28 and 30 as well as by the further lateral tank wall (not shown), which is located in front of the figure plane.

The tank 10 may be filled with a service liquid B through a filling opening 34, which is preferably located in the tank top 22, up to a filling level F. To this end, service liquid B may flow into the reception space 32 in the filling direction I through the filling opening 34.

Similarly, service liquid B stored in the reception space 32 may be removed through a removal opening 34 that is preferably formed in the tank bottom 24. In this case, the service liquid B flows out of the tank 10 in the removal direction A through the removal opening 36. To this end, a removal module (not shown in FIG. 1) may be provided in the removal opening 36, which contains functional elements such as a delivery pump, a filling level sensor, a heater and the like. The removal module may then have a tap opening, to which a liquid line may be connected that leads to an injection device, in order to inject liquid, here an aqueous urea solution, removed from the tank 10, for a selective catalytic reduction into an exhaust gas jet of the motor vehicle carrying the tank 10.

A top tank shell 12 preferably has a local protrusion 38, in which preferably also the filling opening 34 is located. In the region of this protrusion 38, a cross-sectional area Q1 in a first cross-sectional plane E1, which is oriented orthogonal to the surface of the liquid level S of the service liquid B, is greater than the cross-sectional area Q2 in a cross-sectional plane E2 outside of the protrusion 38, which is parallel to the first cross-sectional plane E1. Therefore, the distance a between the liquid level S and the tank top 22 is greater in the region of the protrusion 38 than outside of the protrusion 38.

The protrusion 38 is used to locally provide a volume reservoir 40 in the reception space 32, into which any freezing surface liquid may expand without placing an excessive mechanical load on the tank walls 26, 28, 30, the tank top 22 or the tank bottom 24.

In order to ensure that the service liquid B in the region of the protrusion 38 freezes last in the case of consistent external ambient temperatures, the tank 10 or more accurately the top tank shell 12 has, in the region of the protrusion 38, a locally enhanced thermal insulation 42.

In the embodiment example of FIG. 1, the locally enhanced thermal insulation 42, which is formed integrally in sections with the top tank shell 12 and thus with the tank walls—the tank top 22, the lateral tank walls 26 and 30, is realized by forming the wall thickness of the top tank shell 12 with an enhanced thickness dimension D, whilst the remaining walls of the service liquid tank 10 have a thickness dimension d that is reduced by comparison therewith. The flanges 16 and 18 are not to be regarded as a tank wall that is thicker in sections.

As a result of the increased thickness, in spite of the fact that otherwise the same material is used for producing the tank wall, an enhanced resistance to the amount of heat penetrating the tank wall is provided, so that the region of the protrusion 38 with the locally enhanced thermal insulation 42 remains warm for longer than the remaining region of the tank 10. Thus, in particular in the particularly critical case in which the service liquid B has been filled into the tank 2 up to its nominal filling level F, the formation of a liquid bubble completely enclosed by already frozen service liquid B may be prevented, which then freezes under further heat output and may thus destroy the tank 10.

Instead, the locally enhanced thermal insulation 42, which is provided, at least in sections, beyond the nominal filling level F up to the tank bottom 24, ensures that the service liquid B, in the region of the protrusion 38, will freeze last at its liquid surface S. Moreover, in the region of the protrusion 38, the volume reservoir 40 is provided above the section of the service liquid B that freezes last, into which the then freezing service liquid B may expand.

In this way, a destruction of the tank 10 by expanding freezing service liquid B may be prevented.

Figure 2:
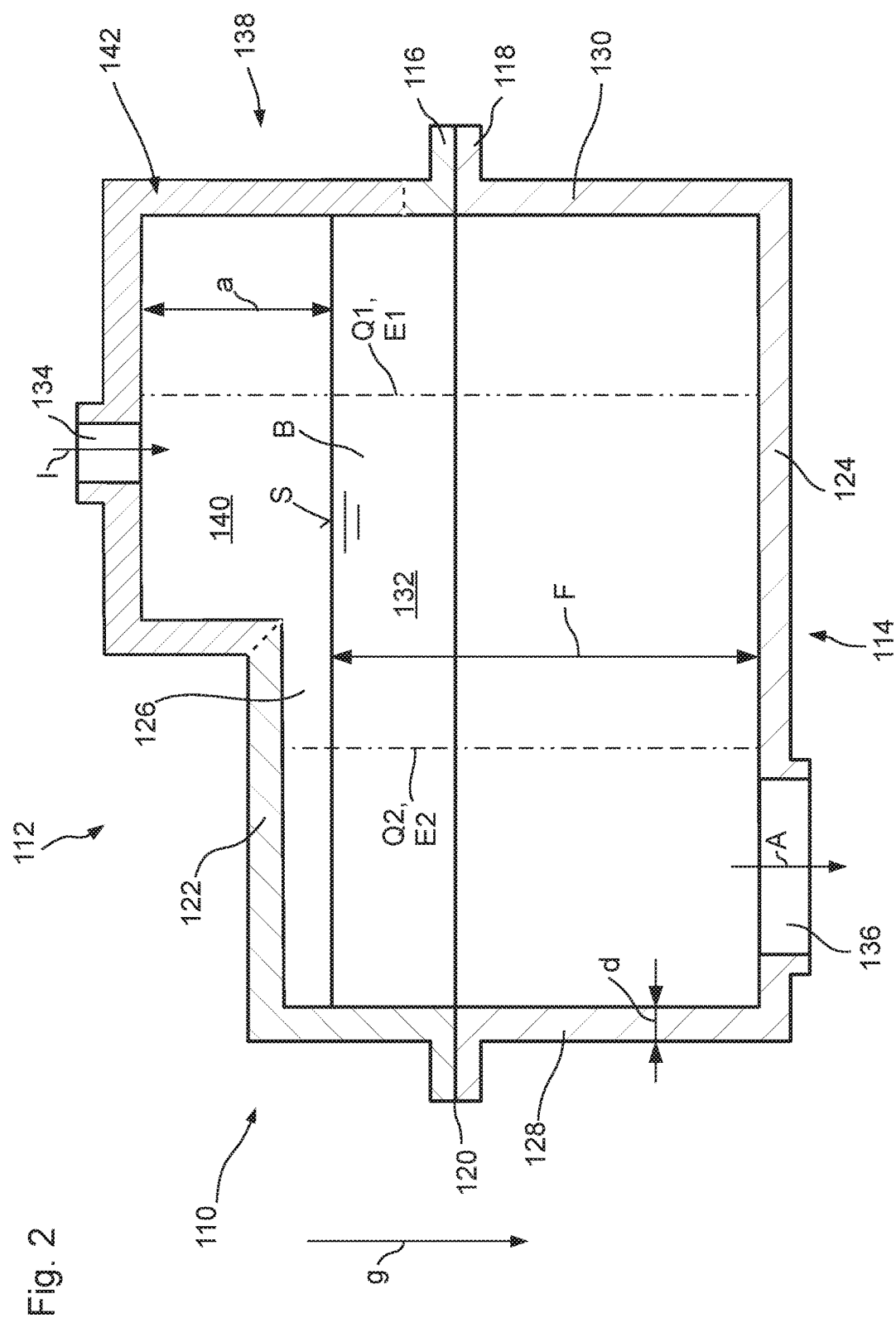
FIG. 2 shows a schematic longitudinal sectional view through a second embodiment of an automotive service liquid tank according to the invention.

FIG. 2 shows a second embodiment of a tank according to the invention. Same and functionally identical sections and component sections compared to the embodiment shown in FIG. 1 have been provided with the same reference numerals in the second embodiment shown in FIG. 2, however increased by the number 100.

The second embodiment will therefore be explained below only insofar as it differs from the first embodiment, to the description of which reference is expressly made for an explanation of the second embodiment.

Unlike the first embodiment, in FIG. 2 the locally enhanced thermal insulation 142 is not formed by a greater thickness dimension of the tank wall, but by a different structure of the tank wall in the region of the locally enhanced thermal insulation 142 compared with the remaining region of the tank wall of the tank 110.

For example, the locally enhanced thermal insulation 142 of the second embodiment example may be formed by a local foaming of the material of the tank wall in the region 142 compared to the tank wall of the remaining tank 110, in which the material of the tank wall is not foamed, i.e. is solid, or may be present with a reduced degree of foaming. Such a result may be achieved by using a two- or multi-component injection molding method. As a result of the gas bubbles present only in the region of locally enhanced thermal insulation 142, or present in this region to an increased extent, in the foamed wall material, the thermal conductivity of the material of the foamed or more strongly foamed material compared to the otherwise used unfoamed or less foamed material is reduced, so that again a thermal insulation effect is achieved.

The measure of using different material structures according to the second embodiment may be combined with the measure of the first embodiment, namely the use of wall sections of different thicknesses, in order to enhance the local thermal insulation effect even further.

In addition or as an alternative to different degrees of foaming, the material of the tank wall may be filled, in the region 142 of locally enhanced thermal insulation, with a filling material with a thermal conductivity that is lower than that of the matrix material of the wall, whereas the remaining tank 110 is formed from an unfilled material or from a material with a different filling material or with a lower degree of filling. By this means, too, a lower thermal conductivity may be achieved in the region of the locally enhanced thermal insulation 142 compared to the remaining tank 110 without enhanced thermal insulation.

Further, in addition or as an alternative, an altogether different material or different matrix material in the case of a filled material may be used compared to the region of the remaining tank wall without enhanced thermal insulation. The different material chosen for the region with locally enhanced thermal insulation 142 then has a lower thermal conductivity than that of the remaining tank 110. In case the different materials are not compatible, which is however not preferred, the corresponding tank wall sections may be produced as prefabricated tank components and may be glued together.

These last-mentioned measures may be combined with the use of different wall thicknesses as known from the first embodiment example.

FIG. 3 shows a third embodiment of a tank according to the invention. In the third embodiment shown in FIG. 3, same and functionally identical sections and component sections compared to the ones shown in the first and second embodiments according to FIGS. 1 and 2 have been provided with same reference numerals, however increased by the number 100 or 200, respectively.

The third embodiment will be explained below only insofar as it differs from the first and second embodiments, to the description of which reference is expressly made for an explanation of the third embodiment.

In the embodiment of FIG. 3, a first part 242a of the locally enhanced thermal insulation 242 is realized by a multi-walled, here double-walled embodiment of a section of the tank wall. Here, a second tank wall 244 extends radially within the outer wall of the protrusion 238, which tank wall preferably extends parallel to the outer wall of the protrusion 238 at a constant distance therefrom. In sections, the inner sub-wall 244 of the double-walled tank wall section may project beyond the outer part of this section into the reception volume 232.

As will clearly be easily understood, as a result of the double-walled design, the diminished thermal conductivity or a decreased heat transfer coefficient will again be achieved in the region of the section 242a of the locally enhanced thermal insulation 242, by comparison with a tank wall section of the tank 210 without enhanced thermal insulation.

In a second section 242b with the locally enhanced thermal insulation 242, which in the third embodiment example shown is formed in the region of the tank top 222, the thickness of the tank wall is again increased.

In addition, in this region an insulation element 246 may be received in the section 242b, for example by insert molding or overmolding during an injection molding operation.

In the example shown above, the additional insulation element 246 may be an annular element that surrounds for example the filling opening 234 in a region of the tank wall that is located closer to the reception volume 232.

The insulation component 246 may be inserted into the injection mold as a prefabricated component with a low thermal conductivity, for example due to foaming and/or a corresponding material selection, and may then be insert-molded to the remaining tank wall during an injection operation. Thus, a locally enhanced thermal insulation may be realized also by using locally several different materials.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An automotive service liquid tank for receiving a service liquid for a motor vehicle, the automotive service liquid tank comprising a tank wall that encloses a tank volume on an inside tank space of the tank, the tank having at least one first tank region, compared to at least one other tank region, the at least one first tank region having enhanced thermal insulation in order to influence a freezing behavior of an associated service liquid received in the tank in such a way that, when the outside temperature drops, the associated service liquid freezes in the at least one first tank region with the enhanced thermal insulation later than the associated service liquid freezes in the at least one other tank region without the enhanced thermal insulation, the enhanced thermal insulation being formed integrally within the tank wall.

2. The automotive service liquid tank as claimed in claim 1, wherein the tank wall has tank wall regions of different thicknesses, wherein the tank wall is thicker in the at least one first tank region with the enhanced thermal insulation than in the at least one other tank region without the enhanced thermal insulation.

3. The automotive service liquid tank as claimed in claim 1, wherein the tank wall has different thermal conductivity values, wherein the tank wall has, in the at least one first tank region with the locally enhanced thermal insulation, a lower thermal conductivity value than the at least one other tank region without the enhanced thermal insulation.

4. The automotive service liquid tank as claimed in claim 1, wherein the tank wall has different degrees of foaming, wherein the tank wall in the at least one first tank region with the locally enhanced thermal insulation is foamed to a greater degree than the at least one other tank region without the enhanced thermal insulation.

5. The automotive service liquid tank as claimed in claim 1, wherein the tank wall is formed with a multi-walled structure of different degrees, wherein the tank wall in the at least one first region with the locally enhanced thermal insulation has a larger number of sub-walls located at a distance from each other in the direction of the tank wall thickness than the at least one other tank region without the enhanced thermal insulation.

6. The automotive service liquid tank as claimed in claim 1, wherein the tank wall in the at least one first region is formed by a different number of materials than the tank wall in the at least one other tank region.

7. The automotive service liquid tank as claimed in claim 1, wherein the enhanced thermal insulation, when viewing the tank in an assembled condition in an associated motor vehicle, is provided in a first tank section having a first tank section cross-sectional area of the inside tank space, the tank further including a second tank section without the enhanced thermal insulation having a second tank section cross-sectional area, the first tank section cross-sectional area being greater orthogonally to a free liquid surface of the associated service liquid filled into the tank than the second tank section cross-sectional area and being parallel thereto.

8. The automotive service liquid tank as claimed in claim 1, wherein the tank wall has a protrusion which increases the tank volume, and the enhanced thermal insulation is provided in the region of the protrusion.

9. The automotive service liquid tank as claimed in claim 1, wherein the enhanced thermal insulation, when viewing the tank in an assembled condition in the associated motor vehicle, is provided in a geodetically top half of the tank.

10. A motor vehicle having an automotive service liquid tank with an assembly for a selective catalytic reduction of nitric oxides in the exhaust gas, the component of which is the automotive service liquid tank of claim 1.

* * * * *